Figure 7:
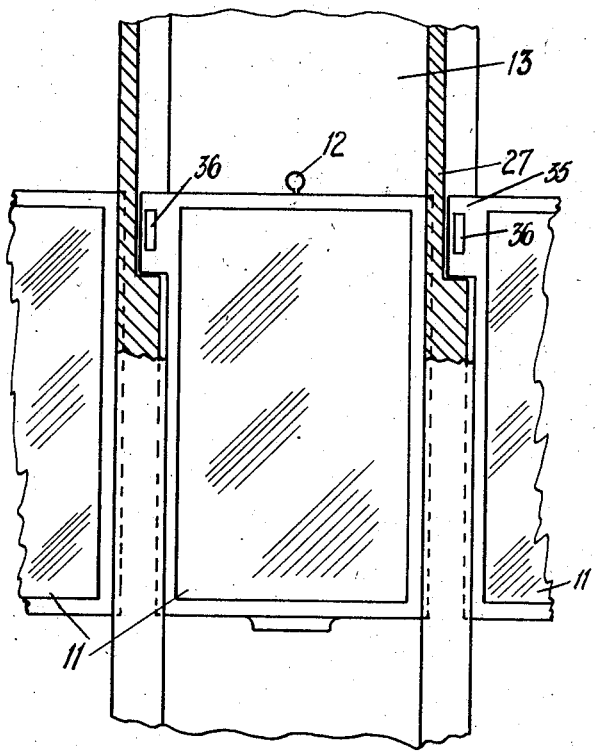

June 13, 1939.   A. McL. LOWE   2,162,625
DISPENSING CABINET FOR OILS OR OTHER FLUENT MATERIALS
Filed April 14, 1939   2 Sheets-Sheet 1
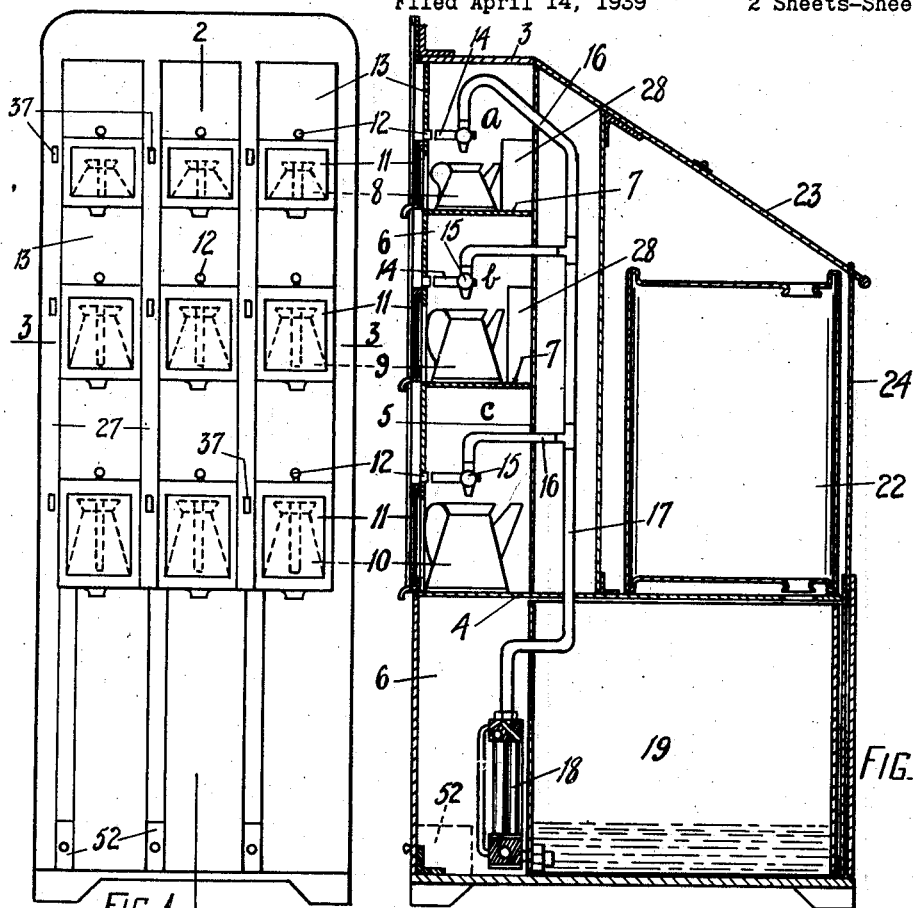
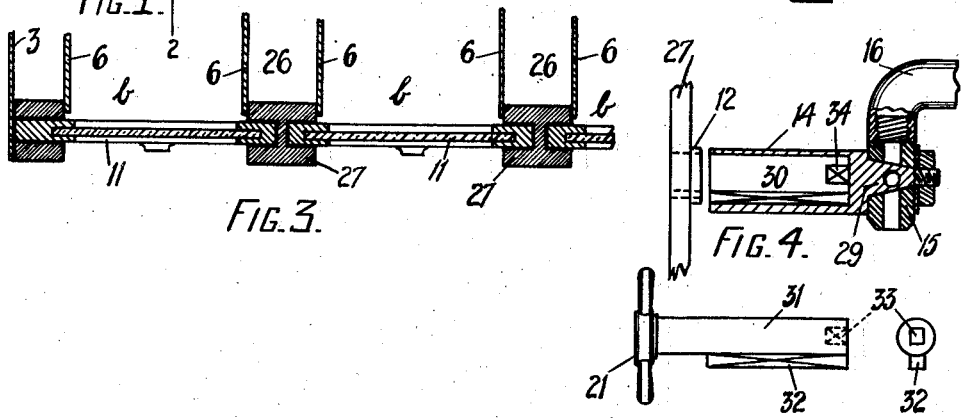
Inventor:
Alexander McLeag Lowe
By Williams, Bradbury, McCaleb & Hinkle
Attys.

June 13, 1939. A. McL. LOWE 2,162,625
DISPENSING CABINET FOR OILS OR OTHER FLUENT MATERIALS
Filed April 14, 1939 2 Sheets-Sheet 2

Inventor.
Alexander McLeay Lowe
By
Williams, Bradbury, McCaleb & Hinkle.
Attys.

Patented June 13, 1939

2,162,625

UNITED STATES PATENT OFFICE 2,162,625

DISPENSING CABINET FOR OILS OR OTHER FLUENT MATERIALS

Alexander McLeay Lowe, Musselburgh, Midlothian, Scotland

Application April 14, 1939, Serial No. 267,760
In Great Britain September 9, 1937

9 Claims. (Cl. 221—68)

This invention has reference to apparatus for use in dispensing measured quantities of oil or any fluent liquid or solid material and for checking and registering the issue of such measured quantities. Although the improved apparatus is primarily designed for dispensing various brands of lubricating oils in garages, filling stations and other sales service stations and for checking and registering the issued quantities of the various brands of oils, it will be apparent from the following description of my invention that the apparatus may be employed for issuing and recording the issue of measured quantities of any liquid, granular, pulverulent or other fluent liquid or solid material.

It is one of the objects of the present invention to provide an oil dispensing cabinet with automatic sales recording mechanism which will record the issued amount of oil in an accurate, simple and convenient manner. The improved cabinet can be used for dispensing different brands of oil and for dispensing each brand of oil in various predetermined measured quantities, for example in half-pints, pints and quarts, and it is a further object of the invention to provide an automatic record of the issued number of each predetermined measured quantity, that is to say, a record of how many half-pints, how many pints and how many quarts of each brand of oil have been issued. This is an important and desirable feature in the sale of brands of oils which are sold at prices which are not directly proportional to the quantity sold, but where for instance the price of one quart of oil is less than the total price of two separate pints of the same oil.

The improved apparatus comprises a cabinet subdivided by partitions into a series of compartments each adapted to contain a measuring vessel or pouring can, and each compartment is fitted at the front of the cabinet with a door adapted to be opened and closed and adapted to interlock with means for controlling a supply pipe for supplying oil to the measuring vessel in its associated compartment in such a manner that oil cannot be supplied to any compartment when the door of that compartment is open or partially open, and the oil supply to any compartment can only be established when the door of that compartment is closed.

Conveniently the oil supply to each compartment is controlled by a tap or valve operated by a removable key inserted through a key-hole in the front of the cabinet, said key-hole being obstructed when the door of the associated compartment is opened, for which purpose the door itself may obstruct the key-hole.

The apparatus also comprises means for recording every time the door of a compartment is opened.

In one convenient manner of carrying out the invention the cabinet, which may be made of sheet steel or any other suitable material, is sub-divided into two or more series or rows of compartments of different sizes to accommodate measures of different capacity, for example, half-pint, pint and quart measures. Preferably each series of compartments of varying capacity is vertically arranged, so that different measures for the same brand of oil can be stacked in a vertical column, with measures for different brands of oil in adjacent columns. Each cabinet is provided with an oil supply and delivery pipe, fed from an oil drum, tank or reservoir mounted in any convenient position, preferably within the cabinet. The oil supply and delivery pipe to each compartment is fitted with a tap or valve operated by a removable key inserted through a key-hole in the front of the cabinet, the key-hole being so situated that the key must be removed before the door of the associated compartment can be opened. The doors may be transparent.

The accompanying drawings illustrate one construction of oil dispensing cabinet according to my invention. Fig. 1 is a front elevation and Fig. 2 is a side elevation in section on line 2—2 of Fig. 1.

Fig. 3 is a detail view to a larger scale in section on line 3—3 of Fig. 1.

Figure 8:
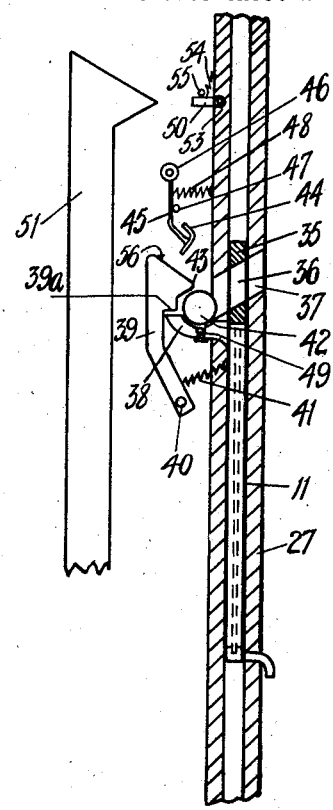

Fig. 4 is a detail view partly in section showing one of the oil delivery taps. Fig. 5 is a side view and Fig. 6 an end view of the valve key. Fig. 7 is a detail view to a larger scale showing one of the sliding doors, part of the guide-ways being shown in section. Fig. 8 is a detail side view showing the check-freed mechanism for releasing the door.

In the construction illustrated by the drawings, the cabinet has an outer casing 3, and the upper portion of the cabinet is separated from the lower portion by a horizontal partition 4. The front portion of the upper part of the cabinet is separated from the rear portion by a vertical partition 5, and the portion in front of the partition 5 is sub-divided into compartments by spaced vertical partitions 6, and spaced horizontal partitions 7 to form three vertical rows of measuring compartments side by side with three compartments in each row. The compartments a, b, c of each vertical row successively vary in size to receive respectively half-pint measures 8, pint measures 9 and quart measures 10. As seen from Fig. 3, the vertical partitions 6 are in pairs, each pair enclosing a space 26 which extends from top to bottom of the cabinet and houses check-freed mechanism hereinafter described. Each compartment a, b, c is closed at the front by a vertically sliding transparent door 11, above each of which (when the door is closed) is a key-hole 12 in a front plate 13 across the front of each compartment of the cabinet, the front of the cabinet having openings therein to give access to the measures 8, 9 and 10 when the doors are raised. The edges of the said doors slide in suitable vertical guide-ways 27 and each door, when lifted, obstructs the associated key-hole 12. Behind each key-hole is a hollow sleeve or hollow spindle 14 for controlling a delivery tap 15 at the discharge end of a branch 16 of an oil pipe 17 which is connected through an oil pump 18 to an oil tank 19 in the lower part of the cabinet. There are three oil tanks 19 side by side, each supplying oil through a pump 18 to a pipe 17, one for each vertical set of measures 8, 9 and 10, that is to say, a vertical section through the cabinet through any vertical row of compartments a, b, c will correspond to the view shown in Fig. 2.

The oil cabinet described with reference to the drawings is capable of dispensing three grades of oil, one from each vertical row of compartments, each row containing three oil measures 8, 9 and 10, namely, half-pint, one pint and one quart measures. As seen in Fig. 2, the compartments a and b have filling pieces 28 so that the compartment a cannot accommodate a measure from the compartment b or c, nor can the compartment b accommodate a measure from compartment c.

One of the oil delivery taps 15 is shown in detail in Fig. 4, from which it will be seen that the rotary plug 29 of the tap turns with the hollow spindle 14 which has a key-hole recess 30 therein to receive the cylindrical shank 31 and projection 32 of a removable key 21. The end of the key may have a square recess 33 to receive a square projection 34 at the inner end of the hollow spindle 14. Consequently, the key 21 can only be passed through the key-hole 12 into the hollow spindle 14 when the key-hole recess in the spindle 14 correctly registers with the key-hole 12, in which position of the spindle 14, the valve plug 29 closes the tap 15. When the key 21 is inserted in the spindle 14 and the recess 33 in the key is engaged with the projection 34, the key 21 can be used to turn the spindle 14 and thus to turn the valve plug 29 to open the tap 15. The key can only be withdrawn when the spindle 14 is in the position in which the valve plug 29 closes the tap 15. The key 21 can only be inserted or withdrawn when the door 11 of the corresponding compartment is closed and as each compartment must be closed before its measuring vessel can be filled, the contents of each measure are protected from rain, dirt and dust.

To allow any measure to be withdrawn, the door of its compartment must be raised, which cannot be done until the key has been withdrawn, and, as above described, the key is so shaped that it cannot be withdrawn until the tap 15 is closed.

The oil may be stored in bulk in the oil tanks 19 and these may be replenished from standard oil drums, one of which is shown at 22 supported in a compartment at the back of the cabinet, this compartment having a hinged lid 23 and a slidable back panel 24. To replenish any one of the tanks 19, the back panel 24 and lid 23 are opened, and a full oil drum 22 is placed in position and tapped or pierced at the bottom to discharge the contents of the oil drum 22 into the desired tank 19.

Referring now more particularly to Figs. 7 and 8, I have shown therein check-freed mechanism for releasing the doors of the cabinet. Each door has at one of its upper corners a lug 35 with a slot 36 therein which registers, when the door is closed, with a slot 37 in the vertical guideway 27 of the door 11. When a check or token of proper size is inserted through the slots 36 and 37, it drops into a recess in a lug 38 projecting from the back of the door 11 in the path of a locking catch 39 pivoted at 40 and pulled forwards by a spring 41. When the door is lifted, the check 42 engages an overhanging nose 43 on catch 39 and pushes the catch 39 clear of the lug 38. If no check is inserted, the door 11 can only be raised until the lug 38 strikes a shoulder 39a on the catch 39. Assuming that a check 42 has been inserted and the door partly opened, the further lifting of the door moves the check 42 against a V-shaped striking plate 44 projecting laterally from a pivotally suspended arm or rod 45 pivoted at 46 and pulled forwards against a stop 47 by a spring 48. The upward movement of the door thus causes the check 42 to rise past the striking plate 44, and when the door is further raised, an ejector 49 pivoted on the lug 38 and projecting laterally therefrom strikes a pin or projection 50 and throws the check 42 out of the slot in the lug 38 and ejects the check into the mouth of a shoot 51 down which the check falls into a drawer or collecting receptacle 52 (Figs. 1 and 2) at the bottom of the space between the vertical partitions 6.

When the door has been fully opened and is being reclosed, the ejector 49 rides past the pin or projection 50, which for this purpose is pivoted at 53 and pulled by a spring 54 against a stop 55. Thereupon the lug 38 rides past the V-shaped striking plate 44 and strikes an incline 56 on locking catch 39, and pushes the catch 39 backwards until the lug 38 has cleared nose 43, whereupon catch 39 returns to its locking position.

By providing different checks for the different measures, the assistant in charge of the cabinet can only open any compartment after inserting the appropriate check, and the proprietor can at any time check the sales by the number of different checks stored in the collecting receptacles 52.

It will be manifest that the invention enables a complete record to be obtained of the sales of oils or like liquid commodities. showing the number of half-pints, pints and quarts that have been dispensed from the cabinet, the oil or other liquid being pre-measured into half-pints, pints and quarts, and that any such measured quantity of any of the different grades of oil stored in the cabinet can be obtained from the cabinet by opening the door or doors of the relative compartment. The oil stored in the cabinet is kept clean and free from all contamination from dirt, dust, rain, snow or other impurities.

I claim:

1. Apparatus for use in dispensing measured quantities of liquids or fluent solid materials, comprising a cabinet subdivided by partitions into a series of compartments each adapted to contain a measuring vessel or pouring can, means for supplying and controlling the supply of liquid or fluent solid material to the measuring vessels, a door fitted to the front of each compartment, and means adapted to interlock with said means for controlling the supply of the liquid or fluent solid material to the measuring vessel and arranged in the path of movement of said doors, whereby such supply to any compartment is shut-off when the door of that compartment is open or partially open and can only be established when the door is closed.

2. A cabinet for dispensing oils or other fluent materials comprising a casing, partitions subdividing the interior of said casing into compartments each open at the front of the casing through an opening therein, a door fitted to the front of each compartment, a measuring and dispensing vessel in each compartment, means for supplying the oil or other fluent material to delivery pipes, one for each measuring and dispensing vessel, a valve on each delivery pipe adapted to be operated by a removable key, and key-holes in the front of the cabinet, one for each valve, said valves and key-holes being so positioned that each key-hole is obstructed when the door of its associated compartment is opened, so that the key cannot be inserted if the door is opened and the door cannot be opened if the key is in the key-hole.

3. An oil storage cabinet subdivided by partitions into two or more series or rows of compartments accommodating measures side by side, an oil supply pipe leading to each compartment, a key-operated delivery tap or valve on the oil supply pipe in each compartment, a door fitted to the front of each compartment, a removable key for the delivery tap or valve in each compartment, and a key-hole in the front of each compartment to receive said removable key, said key-hole being so situated that the door of the associated compartment cannot be opened when said key is in said key-hole.

4. A cabinet for dispensing oils or other fluent materials comprising a casing, partitions subdividing the interior of said casing into two or more series of horizontal or vertical rows of compartments each open at the front of the casing through an opening therein, a door fitted to the front of each compartment, a series of measuring vessels of different capacities for each row of compartments, each compartment being fitted with one of said vessels, means for supplying the oil or other fluent material to delivery pipes, one for each measuring and dispensing vessel, a valve on each delivery pipe adapted to be operated by a removable key, and key-holes in the front of the cabinet, one for each valve, said valves and key-holes being so positioned that each key-hole is obstructed when the door of its associated compartment is opened, so that the key cannot be inserted if the door is opened and the door cannot be opened if the key is in the key-hole.

5. A cabinet for dispensing oils or other fluent materials comprising a casing, partitions subdividing the interior of said casing into two or more series of horizontal or vertical rows of compartments each open at the front of the casing through an opening therein, a door fitted to the front of each compartment, a series of measuring vessels of different capacities for each row of compartments, each compartment being fitted with one of said vessels, the compartments of each series being of such different sizes and the measuring vessels of the corresponding series being of such different sizes that a measuring vessel of a larger size than that for which each compartment is designed cannot be fitted therein, means for supplying the oil or other fluent material to delivery pipes, one for each measuring and dispensing vessel, a valve on each delivery pipe adapted to be operated by a removable key, and key-holes in the front of the cabinet, one for each valve, said valves and key-holes being so positioned that each key-hole is obstructed when the door of its associated compartment is opened, so that the key cannot be inserted if the door is opened and the door cannot be opened if the key is in the key-hole.

6. An oil storage cabinet subdivided by partitions into two or more horizontal or vertical series or rows of compartments, each accommodating a measuring vessel, a door fitted to the front of each compartment, one or more oil storage reservoirs in said cabinet, a pump for supplying oil from said reservoir or each reservoir to oil supply pipes opening one into each compartment, and removable control means for said supply pipes and disposed adjacent said doors for normally preventing opening thereof, said last mentioned means being constructed for removal only when the oil supply to any compartment is shut off.

7. A dispensing cabinet comprising a casing, partitions subdividing the interior of said casing into compartments each open at the front of the cabinet through an opening in said casing, a door fitted to the front of each compartment, a measuring and dispensing vessel in each compartment, liquid delivery pipes leading to delivery taps, one in each compartment above the vessel therein, means whereby the delivery taps cannot be opened when the doors are opened and whereby any delivery tap can only be opened when the door of its associated compartment is closed, and means for recording when any door has been opened.

8. A dispensing cabinet comprising a casing, partitions subdividing the interior of said casing into compartments each open at the front of the cabinet through an opening in said casing, a door fitted to the front of each compartment, a measuring and dispensing vessel in each compartment, liquid delivery pipes leading to delivery taps, one in each compartment above the vessel therein, means whereby the delivery taps cannot be opened when the doors are opened and whereby any delivery tap can only be opened when the door of its associated compartment is closed, and means for recording when any door has been opened comprising check-freed locking mechanism associated with each door, and check-collecting means within the cabinet.

9. A dispensing cabinet comprising a casing, partitions subdividing the interior of said casing into compartments each open at the front of the cabinet through an opening in said casing, a door fitted to the front of each compartment, a measuring and dispensing vessel in each compartment, liquid relivery pipes leading to delivery taps, one in each compartment above the vessel therein, each of said taps being operable by means of a removable key, key-holes in the front of the cabinet, one for each tap, said taps and key-holes being so positioned that each key-hole is obstructed when the door of its associated compartment is opened and is unobstructed when the door is closed, check-freed locking mechanism associated with each door and operable by the insertion of checks through slots in the front of the cabinet, one for each compartment, and check-collecting means within the cabinet.

ALEXANDER McLEAY LOWE.